Nov. 18, 1952 R. K. IGO 2,618,095
WEED-FREE FISHHOOK AND LURE
Filed June 8, 1951
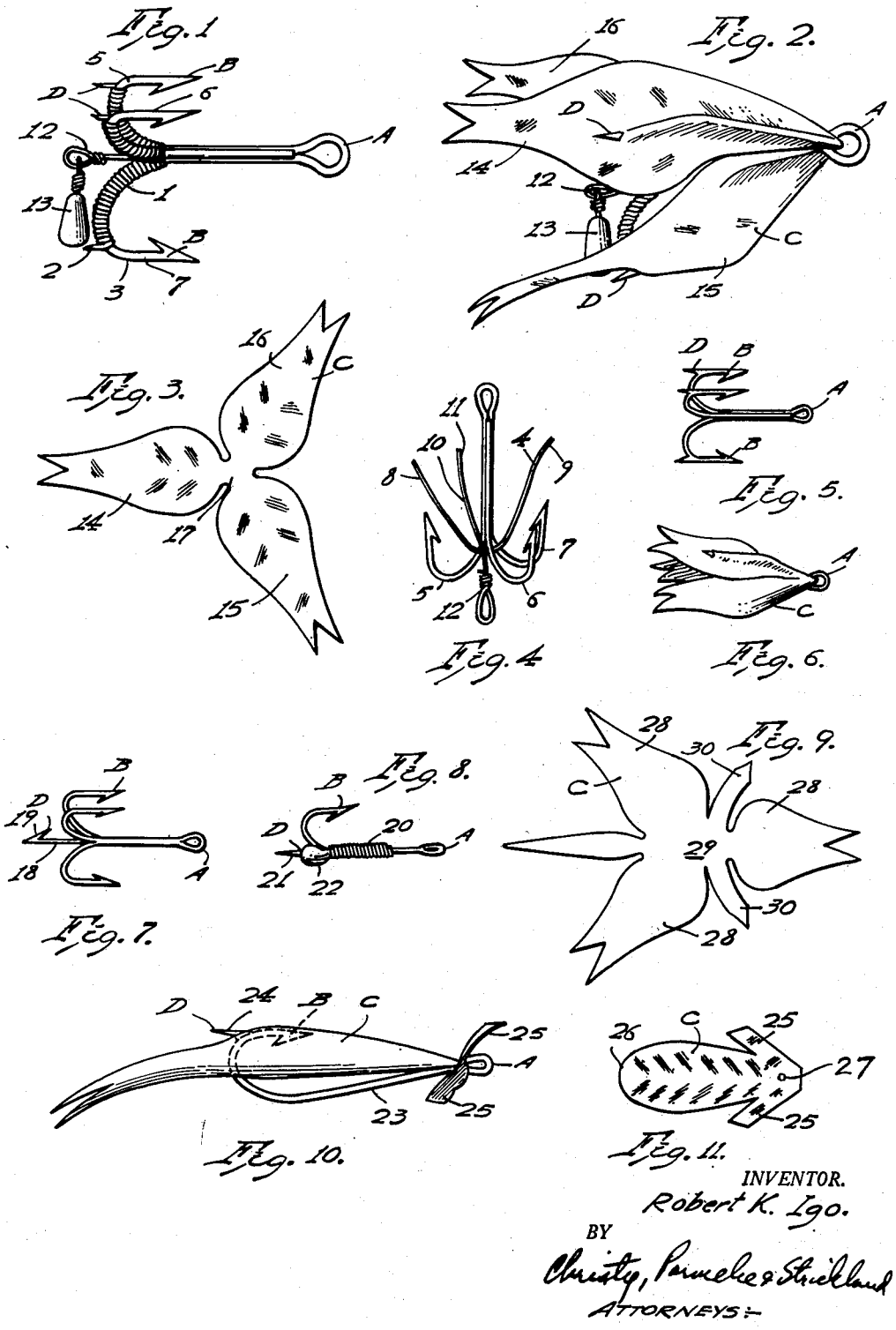
INVENTOR.
Robert K. Igo.
BY
Christy, Parmelee & Strickland
ATTORNEYS Patented Nov. 18, 1952

2,618,095

UNITED STATES PATENT OFFICE 2,618,095

WEED-FREE FISHHOOK AND LURE

Robert K. Igo, Pittsburgh, Pa.

Application June 8, 1951, Serial No. 230,629

4 Claims. (Cl. 43—42.24)

This invention relates, as indicated, to a weed-free fishhook and lure.

The invention has as one of its principal objects the provision of an improved fishhook which will not snag or become fouled with weeds or other debris while trolling. The protection against fouling on sea weed and the like is accomplished by the provision of a protective skirt or apron which is applied to the hook in a novel manner. This skirt or apron is fabricated from a flat thin flexible sheet of rubber which is mounted on the hook by connecting one part to the line attaching eye and another part to a trailing barb which is added to a conventional hook in a manner to be described. The protective skirt or apron of rubber covers the conventional hook and its barb so that it will not gather up sea weed or other hook fouling substances. The skirt or apron being formed of rubber, however, will flex when the hook is struck by a fish so as to render the conventional barbed hook operative in the usual fashion. The essential metal parts of the hook are in operation substantially concealed by the protective skirt or apron which is thereby effective to convert the ordinary hook into a lure.

Other objects and advantages of the invention will become apparent from the following description.

In the drawings, there are shown several embodiments of the invention. In this showing:

Fig. 1 is a view illustrating a conventional triple hook and showing the application thereto of a trailing barb structure;

Fig. 2 shows the hook of Fig. 1 with a protective skirt or apron applied thereto;

Fig. 3 is a plan view on a reduced scale of the skirt or apron applied to the hook in Fig. 2;

Fig. 4 is a fragmentary view of a conventional three prong hook showing the manner in which the trailing barb or protective apron attaching structure is applied to the hook;

Fig. 5 is a view of a conventional three prong hook having a modified form of protective apron attaching barb;

Fig. 6 is a view showing the hook of Fig. 5 with a protective apron applied thereto;

Fig. 7 shows a hook with another modified form of trailing or apron attaching barb;

Fig. 8 shows a single prong hook provided with a modified form of trailing barb structure;

Fig. 9 is a plan view of a modified form of protective apron illustrating the manner in which the principles of this invention are applicable to convert a hook into a lure;

Fig. 10 illustrates a single prong hook having a protective skirt or apron applied thereto; and Fig. 11 shows a modified form of apron for application to a hook having a single prong.

The fishhooks shown in the accompanying drawings are conventional types which may be described generally as having a line attaching eye A at one end with its other end curved in the shape of a semi-circle and terminating in a barbed hook B which projects forwardly in the direction of the line attaching eye A. The principles of this invention are applicable to multiple barb hooks as shown in Figs. 1 and 5 or to single barb structures as shown in Figs. 8 and 10. The protection against fouling on sea weeds and the like is provided by a protective skirt or apron C which is applied to the hook in such manner as to cover and conceal its barbed hook or hooks B. The skirt or apron C is formed of a thin flat sheet of rubber or other suitable flexible material. The material from which the apron C is formed may be either natural or synthetic rubber or any other material having the necessary flexible characteristics but is preferably formed of those materials commercially available under the names "latex" or "neoprene." The apron C is applied to the hook by securing one part thereof in the eyelet A and by snagging a trailing portion thereof over a trailing anchoring barb D which projects rearwardly with respect to the forwardly projecting barbed hook B. In this manner, the apron C covers and conceals the barbed hook B on which fish are normally caught. The apron C being formed of flexible material will flex and be pierced by the barbed hook B when a fish strikes the hook and impales itself on the barbed hook B. The apron C is effective to deflect sea weed or other fouling material from the barbed hook B, but is ineffective to interfere with its normal function when taken as bait by a fish.

The trailing barbs D may be integrally connected to the body of the hook as shown in Fig. 5. In such case, the trailing barbs D may be struck from the material forming the body of the hook by a lancing operation, or alternatively may be formed by welding or soldering a pointed element to the body of the hook. In the preferred practice of the invention, the trailing barbs D are provided by winding a wire 1, preferably copper, about the curved end of the hook as shown in Fig. 1. The wire 1 has its terminal 2 pointed and projecting rearwardly from the body 3 of the hook.

In the case of a three prong hook, the barbs D for each of the prongs are formed, preferably, by using only two wires as will be understood by referring to Fig. 4. In this showing, one of the wires is designated by the numeral 4 and has its center portion moved up into the space at the junction of the hooks 5, 6 and 7. It may then be utilized to provide trailing barbs D, for example, on the hooks 5 and 7, by winding its ends 8 and 9, respectively, about the hooks 5 and 7. Before the ends 8 and 9 are wound on the hook to provide the barbs D at their terminal ends, the second wire 10 is placed in the space at the junction of the hooks, as illustrated in Fig. 4, so that it will be secured in position by the ends 8 and 9 after they are wound in place. Thereafter, the free end 11 of the wire 10 may be bent downwardly and wound about the hook 6 so that its terminal end may be used to provide a trailing barb D for the hook 6. The other end 12 of the wire 10 is shaped to provide an attaching eye to which a sinker 13 may be attached as illustrated in Figs. 1 and 2. This feature of the invention provides an effective mount for attaching a small sinker centrally of a three prong hook quite aside from the provision of the trailing barbs D and the weed-freeing principles of this invention. The use of the wires 4 and 10 enables the provision of a sinker mounting attachment for conventional three prong hooks without the necessity of altering the manufacturing operations now used to produce such hooks and without increasing the cost of such hooks.

In the case of a three prong hook as shown in Figs. 1, 2, 5 and 6, the skirt C is formed with three parts 14, 15 and 16 connected centrally at 17 and spaced 120° angularly apart relative to each other. In this manner, the skirt portion 14 may be inserted through the eyelet A and applied to the barb D at the end of the hook 6, and this action will serve to anchor the entire skirt C in position while the skirt portions 15 and 16 are snagged on the barbs D at the ends of the hooks 5 and 7 to complete the connection for securing the skirt in position. This arrangement adapts the protective skirt C to conventional three prong hooks and enables the connection of the skirt to the eyelet A without any special fastening structure or fastening operations.

Fig. 7 shows a modification of the trailing or apron attaching barb D. In place of a separate attaching barb on each of the hooks as shown in Figs. 1 and 5, a rearwardly projecting shaft 18 is secured at the junction of the three hooks and is provided with an attaching barb 19 at its trailing end. With a barb 19 as shown in Fig. 7, each of the skirt portions 14, 15 and 16 as shown in Fig. 3 would be snagged on the barb 19 to secure it in position.

Fig. 8 shows a modification of the invention illustrating the use of a copper wire in the provision of a trailing or anchoring barb and sinker attachment for a single hook. In this showing, a wire 20 is wound on the body of the hook and is provided with a sharpened trailing end 21 which may be used to anchor an apron C in position in a manner to be described. A sinker 22 is mounted on the wire 20 inwardly of its sharpened end 21.

The modification shown in Fig. 10 illustrates the application of the principles of this invention to a single hook. In this showing, the hook 23 has an integral attaching barb 24 projecting rearwardly with respect to its barbed hook B. The skirt C has two laterally projecting parts 25 at its forward end by which it is secured to the eyelet A of the hook 23. The trailing portion of the apron C is then stretched over the barb B and attached to the integral barb 24 as described above. In the case of a single hook as shown in Fig. 8, the apron would be attached to the barb 21.

In Fig. 11 there is shown a modified form of protective skirt which is particularly adapted for use on a hook with a single prong as shown in Figs. 8 and 10. The skirt C in this showing is provided with tie members 25 at its forward end for securing it to an eye A while its trailing portion 26 may be inserted through the eye and fastened to an anchoring barb 24 such as provided on the hook shown in Fig. 10.

The modified form of apron C shown in Fig. 9 may be used on either a single or a three prong hook. It is provided with three similar skirt parts 28 connected centrally at 29, and these skirt parts may be used in a manner similar to the skirt parts 14, 15 and 16 described above. If used on a single prong hook, it is provided with tie elements 30 which may be used to secure it to an eye A in a manner similar to the tie elements 25 shown in Figs. 10 and 11. The contour of the skirt C in Fig. 9 illustrates the manner in which the shape of the protective skirt may be used to enhance the appearance of the hook in its conversion into a lure. With respect to the use of the skirt to impart the characteristics of a lure to the hook, the skirt C may be formed of rubber of varying colors, and additionally may have markings painted thereon to increase its attractiveness as a lure.

As indicated above, one of the prime considerations of this invention is the provision of a protective device which will prevent sea weed and the like from fouling a hook. This is accomplished by the apron C which when in operative position is effective to deflect sea weed or other hook fouling debris out of snagging engagement with the hook, but which will be itself deflected by the force of a fish striking, and, upon piercing of the rubber apron by the hook B, the hook B will be effective to snag the fish. Attention is particularly directed to the fact that it is only necessary to provide conventional hooks with an additional barb B to adapt them for use with a protective apron C in accordance with the principles of this invention. It will also be noted that the apron C may be mounted by a simple operation involving anchoring one end to the eyelet A whereupon the mounting may be completed by stretching the apron slightly to tension it and then snagging its other end over the anchoring barb D. This action completes the protection of the hooked barb B against fouling by sea weed.

As shown in the drawings, it will be noted that the hook structure is substantially planar in construction, the shank and trailing end connecting the eyelet A to the hook B together with the barb D and hook B being positioned in a common plane. The apron C extends transversely of this plane when mounted on the hook so that it will be effective to shed weeds and other debris in its movement through water.

Although one essential feature of the invention is the protection against fouling of a fishhook attention is particularly directed to the fact that the protective apron C as pointed out above additionally converts the hook into a lure. The lure possibilities of the invention will be best understood by noting Figs. 2, 3, 6, 9, 10 and 11. From the lure standpoint, the principles of this invention are not only adaptable to the conversion of a hook into a lure, but are also adaptable to the construction of lures per se. For example, the structure shown in Fig. 6 when made of flesh colored latex rubber has the appearance of a small squid and might be utilized as a lure by connecting it to the attaching device 12 of the hook in Fig. 1, or to the curved portion of the hook 23 in Fig. 10.

Referring again to Fig. 11, the apron C there shown is primarily intended for use with streamer flies. In such case, it may be mounted by inserting the end of the hook through a small opening 27 formed adjacent its forward end. The apron C will then slip over the forward shaft of the hook until the material of the apron about the opening 27 abuts against the fly secured to the hook. The rear portion 26 may then be stretched and snagged over a barb D as described above. In position on the hook, the apron C of Fig. 11 will be on the bottom side of the hook, and, due to its rounded end and the markings on its surface as illustrated, will look like a minnow from its under side, and will thus impart distinct lure advantages to the hook in addition to its weedless features.

While I have illustrated and described several specific embodiments of my invention, it will be understood that this is merely by way of illustration, and that various changes and modifications may be made therein within the contemplation of my invention and under the scope of the following claims.

I claim:

1. The combination with a fishhook comprising a body member of substantially planar construction having a line attaching eye at one end and its other end curved and terminating in a barbed hook extending in a direction toward said eye, of an anchoring barb on said curved end at a point rearwardly of said barbed hook, and a protective apron formed of a thin flat sheet of flexible rubber extending transversely of the plane of said body member, said sheet having a connection at one end with said eye and its other end at a center point along its axis pierced by and anchored on said anchoring barb with a portion intermediate its ends under tension and forming a cover for said barbed hook.

2. The combination defined in claim 1 characterized by said curved end having a wire wound thereon with its terminal end projecting rearwardly to provide said anchoring barb.

3. The combination with a multiple prong fishhook in which each of its prongs comprises a wire body member having one end projecting forwardly and a trailing end curved and terminating in a barbed hook pointing in the direction of said one end, said body members being arranged in planes extending angularly relative to each other and having their one ends secured together with a line attaching eye at their forward terminal ends, of an anchoring barb on each of said curved ends at a point rearwardly of its barbed hook, and a thin flat sheet of rubber providing a plurality of protective aprons corresponding in number to the number of prongs on said fishhook, said aprons having a common central connection with each other and having axes spaced angularly from each other corresponding to the angular spacing of said prongs, said rubber sheet being mounted in position with said central connection extending through said eye and each of said aprons anchored to one of said anchoring barbs with its center portion under tension and forming a protective cover for the barbed hook in advance of the anchoring barb whereby the tension in each of said aprons is effective through said central connection to maintain the tension on at least one other apron.

4. The combination defined in claim 3 characterized by each said body members having a wire wound thereon with its terminal end pointing rearwardly to provide said anchoring barb.

ROBERT K. IGO.

REFERENCES CITED

The following references are of record in the file of this patent:

UNITED STATES PATENTS

| Number | Name | Date |
|---|---|---|
| 889,356 | Carpenter | June 2, 1908 |
| 1,191,031 | Peters | July 11, 1916 |
| 1,538,909 | Shannon | May 26, 1925 |
| 2,115,493 | Kosten | Apr. 26, 1938 |
| 2,560,835 | Williams | July 17, 1951 |

FOREIGN PATENTS

| Number | Country | Date |
|---|---|---|
| 27,166 | Great Britain | 1911 |
| 277,585 | Great Britain | Sept. 22, 1927 |